(12) United States Patent
Hair (10) Patent No.: US 11,207,615 B2
(45) Date of Patent: Dec. 28, 2021

(54) FLOATING LIQUID INTAKE

(71) Applicant: Turret IP Pty Ltd, Mount Hawthorn (AU)

(72) Inventor: Robert Bruce Hair, Boddington (AU)

(73) Assignee: Turret IP Pty Ltd, Mount Hawthorn (AU)

(*) Notice: Subject to any disclaimer, the term of this patent is extended or adjusted under 35 U.S.C. 154(b) by 0 days.

(21) Appl. No.: 16/955,834

(22) PCT Filed: Dec. 21, 2018

(86) PCT No.: PCT/AU2018/051394
§ 371 (c)(1),
(2) Date: Jun. 19, 2020

(87) PCT Pub. No.: WO2019/119064
PCT Pub. Date: Jun. 27, 2019

(65) Prior Publication Data
US 2020/0316497 A1 Oct. 8, 2020

(30) Foreign Application Priority Data

Dec. 22, 2017 (AU) ............................ 2017905172

(51) Int. Cl.
*B01D 35/05* (2006.01)
*E02B 15/10* (2006.01)
(Continued)

(52) U.S. Cl.
CPC ..... *B01D 21/2444* (2013.01); *B01D 21/0087* (2013.01); *B01D 21/2427* (2013.01);
(Continued)

(58) Field of Classification Search
CPC .. B01D 21/2444; B01D 21/307; B01D 35/05; E02B 15/106; E03B 3/04; E04H 4/1263
(Continued)

(56) References Cited

U.S. PATENT DOCUMENTS 3,534,859 A 10/1970 Amero et al.
3,690,463 A * 9/1972 O'Brien ............... E02B 15/106
210/242.3
(Continued)

FOREIGN PATENT DOCUMENTS

CA 1 071 470 A 2/1980
DE 198 43 840 A1 3/2000
(Continued)

OTHER PUBLICATIONS

International Search Report and Written Opinion for PCT/AU2018/051394 dated Mar. 4, 2019.
(Continued)

*Primary Examiner* — Christopher Upton
(74) *Attorney, Agent, or Firm* — Womble Bond Dickinson (US) LLP (57) ABSTRACT

A floating liquid intake for a liquid suction removal system, the liquid intake comprising housing defining an internal cavity. The housing has a hollow and buoyant annular body, an upper cover and a lower cover. The internal cavity is formed between the upper and lower covers. A substantially annular inlet is formed in the annular body for ingress of liquid into the cavity. The annular body has a buoyancy sufficient for the liquid intake to float in a liquid with the annular inlet submerged below the surface of the liquid in which the liquid intake is floating. A pipe extends into the cavity and the pipe includes an inlet that in use is open below the surface of the liquid within the cavity. The pipe extends outside of the cavity for connection to a liquid suction removal system.

17 Claims, 5 Drawing Sheets

(51) Int. Cl.
  *B01D 21/24* (2006.01)
  *B01D 21/00* (2006.01)
  *B01D 21/30* (2006.01)
  *F04D 7/00* (2006.01)
  *F04D 29/70* (2006.01)
  *E03B 3/04* (2006.01)

(52) U.S. Cl.
  CPC ........... *B01D 21/307* (2013.01); *B01D 35/05* (2013.01); *E02B 15/10* (2013.01); *E02B 15/106* (2013.01); *F04D 7/00* (2013.01); *F04D 29/708* (2013.01); *B01D 2201/64* (2013.01); *E03B 3/04* (2013.01)

(58) Field of Classification Search
  USPC ........ 210/122, 167.1, 167.2, 170.05, 190.09, 210/170.1, 242.1, 540, 747.6, 776
  See application file for complete search history.

(56) References Cited

U.S. PATENT DOCUMENTS

| | | | | |
|---|---|---|---|---|
| 3,745,115 | A * | 7/1973 | Olsen | E02B 15/106 210/776 |
| 3,762,557 | A * | 10/1973 | Tudor | E02B 15/106 210/776 |
| 3,782,552 | A | 1/1974 | Wendell | |
| 3,831,756 | A * | 8/1974 | Bhuta | E02B 15/106 210/776 |
| 3,853,767 | A * | 12/1974 | Mohn | E02B 15/106 210/776 |
| 3,853,768 | A | 12/1974 | Bagnulo | |
| 4,243,529 | A | 1/1981 | Strauss | |
| 4,892,666 | A * | 1/1990 | Paulson | E02B 15/106 210/776 |
| 5,118,412 | A * | 6/1992 | Schmidt | E02B 15/106 210/122 |
| 5,244,365 | A | 9/1993 | Catcher | |
| 5,713,697 | A | 2/1998 | Steiner | |
| 6,224,753 | B1 * | 5/2001 | Marbach | E04H 4/1263 210/167.2 |
| 7,022,223 | B2 * | 4/2006 | Lovestead | B01D 21/26 210/170.05 |
| 7,794,589 | B2 | 9/2010 | Kozey | |
| 2007/0227986 | A1 | 10/2007 | Gomez et al. | |
| 2011/0247970 | A1 | 10/2011 | Evingham | |

FOREIGN PATENT DOCUMENTS

| | | |
|---|---|---|
| FR | 1564195 | 4/1969 |
| FR | 2 069 926 A1 | 9/1971 |
| GB | 921441 A | 3/1963 |
| WO | WO 2018/032036 A1 | 2/2018 |

OTHER PUBLICATIONS

Supplementary European Search Report for European Application No. 18 89 3068 dated Aug. 24, 2021.
Translation of Notification of the First Office Action for Chinese Application No. 201880087458.1 dated Oct. 11, 2021.

\* cited by examiner

PRIOR ART

FLOATING LIQUID INTAKE

PRIORITY CROSS-REFERENCE

The present application is a national stage application, filed under 35 U.S.C. § 371 of International Patent Application No. PCT/AU2018/051394, filed 21 Dec. 2018, which claims priority from Australian Provisional Patent Application No. 2017905172 filed 22 Dec. 2017 the contents of which are to be considered to be incorporated into this specification by their reference.

TECHNICAL FIELD

The present invention relates to a floating liquid intake for a liquid suction removal system. The present invention has been developed in relation to the removal of water ("dewatering") from settling ponds, tailing dams, decant ponds, raw water dams, rivers and waterways and it will be convenient to describe the invention in relation to those applications. However, it is to be appreciated that the invention is not limited to those applications.

BACKGROUND OF INVENTION

The following discussion of the background to the invention is intended to facilitate an understanding of the invention. However, it should be appreciated that the discussion is not an acknowledgement or admission that any aspect of the discussion was part of the common general knowledge as at the priority date of the application.

Settling ponds, tailing dams and decant ponds are used in the mining industry for separating solids or immiscible liquids from water. Ponds and dams of this kind are used in mining sites where the tailings by-products of the mining processes that are entrained in water are separated in the pond or dam. The inflow of tailings into a tailings dam constantly adds water to the dam and that water can be removed for reuse in the mining operation. Liquid removal systems are thus used for that purpose. Likewise, the agriculture industry employs dams for holding water for irrigation or relies on rivers for watering stock and removal of that water from dams and rivers is required when the water is to be used.

One liquid removal system known to the applicant employs a suction pumping system in which a pump inlet at the end of a pipe is positioned at or close to the floor of the settling pond or tailings dam so that water is pumped from the pond or dam from that position. A disadvantage with this form of liquid removal system is that the proximity of the pump inlet to the floor of the pond or dam means that the solids that have settled on the floor of the pond or dam are likely to be sucked into the pump inlet if sufficient suction is applied by the pumping system. A further disadvantage of this system is that the pump inlet is positioned where the water is generally least clean and/or has the greatest amount of suspended solids (being towards the floor of the pond or dam where suspended solids sink towards) and so invariably, tailings matter will be entrained in the water being removed. In either instance, there can be a detrimental effect for example on the equipment of the pumping system, i.e. clogging filters and pumps and reducing pumping efficiency, while reuse of the water can be affected if it is too highly contaminated with tailings matter.

Additionally, where the liquid removal system is employed to remove salty water, the higher concentration salty water gravitates to the floor of the dam, leaving the lower concentration salty water at or towards the surface of the dam, so that saltier water is removed using the system described above than could be the case if the pump inlet were positioned towards the surface of the dam. This can cause obvious issues if the water is being used for irrigation or stock feed.

The preference is thus for the pump inlet to be positioned furthest away from the floor of the pond or dam and in the most clean water, so that substantially only clean water is removed.

Figure 1:
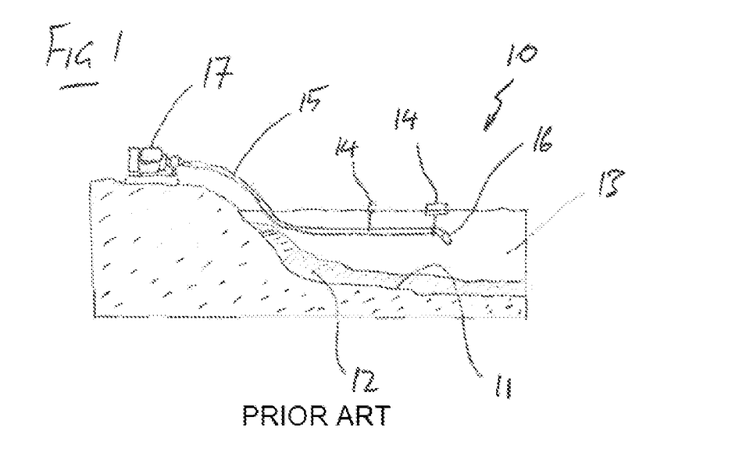
FIG. 1 is a schematic illustration of a prior art pumping arrangement.

Another liquid removal system known to the applicant employs a float which suspends the pump inlet at an upper level in the pond or dam. This system is illustrated in FIG. 1 which shows a dam 10 having a floor 11, a body of silt and debris 12 resting on the floor 11 and a body of water 13 above the silt and debris 12. There will often be a transition zone between the body of silt and debris 12 and the body of water 13 in which silt and debris is suspended in the water, whereby the density of the suspension is greatest adjacent the body of silt and debris 12. Floats 14 suspend a pipe 15 that extends to a pump inlet 16 at one end and a pump 17 at the opposite end. The system of FIG. 1 advantageously at least initially locates the pump inlet 16 away from the floor 11 of the pond or dam 10 and thus away from the silt and debris 12, however because of the proximity of the pipe inlet to the surface of the body of water 13, a strong suction from the pump can create a vortex in the water which can allow air to enter the pump system through the pump inlet 16. This can lead to significantly lower pumping performance by affecting the volumetric performance of the pump 17, i.e. the volume of liquid that can be displaced from the pond or dam 10 by the pump 17, but more importantly, the existence of air in the liquid flow through the pump 17 can damage the pump 17 through vibration and there can be a loss of pump performance. The solution is to lower the pump inlet 16 to a depth at which vortices are not formed, which is under the level of what is known as "critical submergence", to prevent the formation of vortices, so that air does not become entrained in the flow through the pump inlet 16. However, this requires that the pump inlet 16 be lowered to be closer to the floor 11 of the pond or dam 10 and that positioning raises the issue of the first approach discussed above in which in which sediment and solids can be sucked into the pumping system through the pump inlet 16 if the pump inlet 16 is not at or towards the surface of the pond where the cleanest water is located.

There is thus a tension between placing the pump inlet at a position where the cleanest water is located, i.e. towards the surface of the pond or dam, as compared to a position at which the generation of vortices is avoided. This tension means that the pump inlet is often placed at the deepest section of a pond or dam so that the pump inlet can be placed shallow enough to entrain relatively clean water, but also deep enough to prevent the generation of vortexes. This often means that a significant length of pipe must be used to position the pump inlet at the deepest section of a pond or dam (usually the centre of the pond or dam) thus increasing line losses caused by friction between the water and the pipe and thus reducing pump efficiency.

The point of critical submergence at which a pump inlet can be positioned within a body of water in which vortices will be avoided is dependent on factors such as the size of the pump inlet and it's design geometry, the volume of water being pumped (the pump inlet velocity) and the depth of submersion of the pump inlet below the surface of the water. The approaches described above work adequately in ponds or dams of sufficient depth that allow the pump inlet to be positioned in clean water, at a depth which is at or below the point of critical submergence, but away from the sediment located on the floor of the pond or dam. However, ponds and dams are often shallow at the point at which the pump inlet can be positioned and shallow water presents a difficulty in relation to liquid removal given the needs expressed above to avoid ingress of sediment and solids into the pump inlet and the need to avoid the generation of vortices.

Another issue with systems in which a float is used to suspend the pump inlet at an upper level in the pond or dam is that as the water level reduces in the pond or dam, the suspended pump inlet moves closer to the floor and thus to the sediment and solids that are present at the floor, increasing the likelihood of entraining the sediment and solids through the pump inlet into the pumping system over time. In these systems, because the suspended pump inlet is suspended at a depth which is at or below the point of critical submergence so the pump inlet is below the liquid surface of the pond or dam, the body of water above the pump inlet is not a usable body in terms of positioning of the pump inlet in clean water and away from the floor of the pond or dam. The potentially clean body of water above the pump inlet can therefore not be accessed.

The applicant has already developed a floating liquid intake which is the subject of International Patent Application PCT/AU2017/050697. While the invention of that application provides advantages over the prior art, the applicant has developed the present invention to provide further advantages as will become apparent from the following description.

SUMMARY OF INVENTION

According to the present invention, there is provided a floating liquid intake for a liquid suction removal system, the liquid intake comprising housing defining an internal cavity, the housing having:

a hollow and buoyant annular body, an upper cover extending upwardly from the annular body, and a lower cover extending downwardly from the annular body, the internal cavity being formed between the upper and lower covers, a substantially annular inlet formed in the annular body for ingress of liquid into the cavity, the annular body having a buoyancy sufficient for the liquid intake to float in a liquid with the annular inlet submerged below the surface of the liquid in which the liquid intake is floating, a pipe extending into the cavity, the pipe including an inlet that in use is open below the surface of the liquid within the cavity, the pipe extending outside of the cavity for connection to a liquid suction removal system.

A floating liquid intake according to the present invention provides various benefits over the prior art which will become apparent from the discussion that follows.

A floating liquid intake according to the present invention includes a hollow, annular and buoyant body, which can provide the sole form of buoyancy for the liquid intake. Moreover, the annular body can form a ring from which the upper and lower covers extend and through which each of the annular inlet and the outlet pipe opening extend. The annular body is thus formed in a manner that means that the number of component parts that the liquid intake requires is reduced, compared to the prior art and in particular the applicant's prior floating liquid intake which is the subject of International Patent Application PCT/AU2017/050697. The formation of the annular body as a buoyant body has allowed the liquid intake to be developed in a manner that can be more easily commercially manufactured, as the annular body can be manufactured as a single part and the remaining components attached or assembled thereto. The reduction in component parts means the manufacturing time and effort to produce a liquid intake according to the present invention is reduced and the manner in which the annular body can be formed means that the accuracy of manufacture is high and repeatable.

The liquid intake can be formed to depth in the vertical direction that is much less than the width in the horizontal direction, so that the liquid intake is disc shaped. The annular body can have the greatest diameter of the liquid intake in the horizontal plane so that all other components of the liquid intake are inboard of the periphery of the annular body in the horizontal plane. This makes the liquid intake very stable when floating. The diameter of the annular body can be in the order of 3 m, or greater or lesser.

The annular body has a buoyancy that is sufficient for the liquid intake to float in a liquid with the annular inlet submerged below the surface of the liquid in which the liquid intake is floating. The annular inlet is substantially horizontal when the liquid intake is floating, although of course movement in the liquid will cause movement of the annular body and thus the annular inlet. The annular inlet is also intended to have a substantially uniform or constant inlet cross-section or shape so that the volume of flow of liquid through the inlet is constant about the inlet subject to a constant suction pressure being applied through the pipe inlet.

With the annular inlet submerged below the surface of the liquid in which the liquid intake is floating, the annular body can disrupt any vortices that form through suction of liquid into the liquid intake or can prevent the formation of vortices. This occurs because liquid is drawn into the cavity about substantially the full circumference of the annular body rather than in principally a single direction or from a single area, as is the case in prior art systems in which a pump inlet is placed too close to the surface of a body of liquid. This is important as the approach velocity of liquid arriving at the pipe inlet of a floating liquid intake according to the present invention will be substantially uniform from all directions and is slower than for prior art intakes, so that the energy available to form and maintain a vortex is lower. Beneficially, this means that the likelihood of forming a vortex is much lower than in prior art intakes and testing has shown that an acceptable suction pressure can be employed in which vortexes are not formed. This suction pressure can be the same as, or even higher than in prior art intakes, so there is no reduction in suction and thus there is no reduction in suction performance by adopting the present invention.

A further benefit of the present invention is that debris, fish and other fauna are more likely to float past the pipe inlet than to be entrained into the inlet and subsequently be sucked into the pumping system, given the relatively slow flow of liquid past or to the pipe inlet. Still further, the relatively slow flow of liquid past or to the pipe inlet reduces the propensity for the liquid flow to disturb the sediment and solids on the pond or dam floor, so that the sediment and solids are not lifted into the water above them. Despite this, inlet covers, shields or screens can be employed over the annular inlet to resist ingress of debris and other matter into the cavity of the liquid intake if required, such as in particularly debris laden liquid, flood waters for example.

As a broad rule, to achieve an approach velocity in which the above described benefits are provided, the radius of the annular inlet should be at least about equal to the height of the critical submergence that would otherwise apply to a prior art liquid removal system. Thus, where a critical submergence of 1.5 m would apply, the radius of the annular inlet should likewise be at least about 1.5 m. A greater radius can be provided, but a lesser radius is preferably avoided.

Moreover, any vortex that is formed outside the periphery of the liquid intake is disrupted by the annular body which forms an impediment to the flow of the upper layer of liquid within which the liquid intake is positioned.

Advantageously, this means that the liquid intake of the present invention can be used to extract water from close to the surface of a dam or pond where the cleanest liquid is normally located and because the liquid intake floats on the surface of the dam or pond, the changing level of the dam or pond does not affect the position of the pipe inlet relative to the surface of the dam or pond. This allows the liquid intake of the present invention to be used in shallow liquid that would not be appropriate for prior art liquid removal systems and beneficially, this allows the liquid intake of the present invention to be positioned closer to the edges of a dam for example rather than being positioned inboard of the edge in deeper regions of liquid.

Testing of a liquid intake according to the present invention has found that it is able to operate effectively in water depths as shallow as 400 mm without creating vortexes that lead to loss of pump performance and pump damage within the pumping system. That depth is not suitable with other prior art liquid removal systems (although could be suitable for applicant's prior floating liquid intake which is the subject of International Patent Application PCT/AU2017/050697) except if the suction pressure is significantly reduced. Testing has also shown that in water depths as shallow as 400 mm, the cleanest water is still being drawn given that the pipe inlet can be placed only just below the surface of the water within the cavity of the liquid intake.

The ability to operate in depths as shallow as 400 mm offers significant benefits to the present invention. As indicated above, it means that the liquid intake according to the present invention can be placed closer to the bank of a pond or dam than prior art arrangements and this leads to greater efficiency due to a reduction in line losses. For some ponds or dams with relatively steep embankments, the liquid intake of the present invention can be placed within stepping distance off the water's edge, such as within 0.5 m off the water's edge. This contrasts with some prior art arrangements as described above in which the pump inlet is located a significant distance away from the water's edge and well below the water surface. Notably, the liquid intake of the present invention will not dredge or erode the bank of the pond or dam when it is placed close to the bank as might occur with prior art arrangements, because generally, the velocity of liquid generated by the liquid intake is low and gentle. These are significant benefits realised by the present invention.

The annular body can be of significant size. While the liquid intake can have different sizes for different applications, typical sizes of the liquid intake include a small version in which the annular body has an outside diameter of about 1 m and a large version at an outside diameter of about 3 m. The annular body has thus been developed for rotational moulding which allows the annular body to be formed in one piece or part and accurately produced repeatedly. Rotational moulding also allows the annular body to be formed from suitable materials including medium density polyethylene (MDPE). The use of rotational moulding for producing the annular body has been a key development in the manufacture of the liquid intake of the present invention and is expected to allow more automated production of the liquid intake in less time compared to the floating liquid intake which is the subject of International Patent Application PCT/AU2017/050697 and which has a more complex assembly and a greater number of parts. The floating liquid intake of International Patent Application PCT/AU2017/050697 is fabricated and does not include an annular body that is hollow or that is rotationally moulded. Moreover, the buoyancy of the liquid intake of International Patent Application PCT/AU2017/050697 is provided by a separate floating portion rather than the annular body from which the upper and lower covers extend. The annular body of the liquid intake of the present invention thus provides advantages over the prior art including the liquid intake of International Patent Application PCT/AU2017/050697.

The annular body is a buoyant body. The buoyancy should be sufficient for the liquid intake to float in a liquid with the annular inlet submerged below the surface of the liquid in which the liquid intake is floating. In some forms of the invention, the annular body is buoyant on the basis of the annular body being hollow. In these forms of the invention, the annular body is preferably formed of a material that is resistant to puncture or tearing. Puncture or tearing of the annular body can occur during installation of the liquid intake in a body of liquid (a pond or dam for example) as installation can involve the liquid intake being pushed or dragged over a ground surface and into the body of liquid. The ground surface can be the polyethylene lining on a tailings dam, or the relatively soft surfaces near the edge of a dam or pond, or even across rocks surrounding the body of liquid. While the liquid intake might be supported on skids for travel to the body of liquid, the annular body can nevertheless be exposed to contact with ground surfaces that can puncture or tear the material of the annular body unless the material is of sufficient wear resistance.

In other forms of the invention, the hollow inside of the annular body is filled with a buoyant material or substance such as polyurethane (PU) foam. By this arrangement if the annular body is punctured or torn, it will remain buoyant by virtue of the internal buoyant filling. A further advantage is that the filling of the annular body with a buoyant material can increase the rigidity of the annular body and can provide, if required, a substrate into which fasteners can embed for the attachment of components to the annular body. The buoyant material can for example, be injected into the annular body in any suitable manner.

The cavity of the liquid intake is formed between the upper and lower covers. The annular body can form part of the cavity as a component intermediate the upper and lower covers. The upper cover and/or the lower cover can be formed concavely to have a dome shape. Where each of the upper and lower covers is formed concavely to have a dome shape, the cavity can be generally symmetrical about a horizontal plane through the annular body, although the upper and lower covers can be differently shape domes so that cavity is generally asymmetrical about a horizontal plane through the annular body. In some forms of the invention, the upper cover has a greater diameter than the lower cover.

The annular body can have upper and lower surfaces and radially spaced inner and outer edges. The upper cover and lower cover can attach to and extend from the respective upper and lower surfaces. The annular body can have an opening through which the pipe extends. The opening can extend through the annular body from the outer edge to the inner edge.

The annular inlet formed in the annular body can separate the annular body into first and second annular portions. These portions can extend in parallel planes that, where horizontal, are separated vertically to form the annular inlet. Thus, the first and second annular portions are spaced apart and the annular inlet is formed by the spacing between the first and second annular portions.

The annular body can still be rotationally moulded and both portions can be hollow, although it is an option for the lower portion to be solid. The first and second annular portions can be connected by struts, webs or bracing that again, can form part of the rotational moulding to form the annular body. The struts, webs or bracing can be spaced apart to allow the passage of liquid therepast. The first and second annular portions can alternatively be connected by a substrate that is perforated or slotted to allow the passage of liquid through the substrate.

The first annular portion can be the upper of the two annular portions and can have a greater outside diameter than the second and lower annular portion. The outside diameter of the lower second annular portion can be radially inboard of the inside diameter of the upper first annular portion to create the annular inlet of the annular body.

Ribs or baffles can be used within the cavity of the liquid intake for the purpose of arresting or inhibiting unwanted or undesirable liquid movement within the cavity. This liquid movement can be swirling movement that can be generated by the suction through the pipe inlet. The ribs or baffles can interrupt that swirling movement, or can prevent it from commencing. That swirling movement can generate air bubbles which can become entrained within the liquid entering the pipe intake and so minimising the liquid movement is advantageous, noting that there must be some movement within the cavity for the liquid to be removed via the liquid intake. Acceptable movement is movement which is non-turbulent and so other movement that generates turbulence is movement that is to be resisted or eliminated if possible. The ribs or baffles can be placed anywhere within the cavity and can extend from anyone or more of the upper and lower covers and the annular body. In some forms of the invention, baffles extend upwardly from the lower cover into the cavity. This is convenient as the lower cover will always be immersed in liquid when the liquid intake is operating.

By employing an annular body of a buoyancy in which in use of the liquid intake, the annular inlet is submerged below the surface of the liquid in which the liquid intake is floating, a vacuum can be formed within the cavity if the upper cover is airtight in connection with the annular body, i.e. the annular inlet is substantially the only inlet into the cavity. It is the vacuum within the cavity that draws liquid into the cavity so liquid is drawn to the pipe from the side or radially, rather than from above the pipe inlet. This prevents vortexes from forming within the cavity and as explained earlier, vortices that would form outside the liquid intake are eliminated from continuing to within the cavity by disruption by the annular body.

The development of a vacuum within the cavity can lead to the height of the liquid within the cavity being higher than the surface of the liquid surrounding liquid intake. This can be important because a feature of the liquid intake of the invention is the ability to have the pipe inlet face either upwards or downwards. By the generation of a vacuum, the liquid level within the liquid intake can be higher than the liquid surrounding the liquid intake and this assists to ensure that liquid will flow into the pipe inlet. This has the advantageous effect of allowing the liquid intake of the invention to operate in waters potentially even shallower than 400 mm with no loss of performance.

Suction pumps have a limitation in that they have a theoretical maximum lift of no more than about 10 m. This assumes a perfect vacuum and very few friction losses and in practice, the suction lift is less than this and more likely to be in the order of about 8.5 m. While that level of lift is suitable for many applications, if a greater lift is required, than the present invention can employ a submersible pump within the cavity of the liquid intake. Thus, in accordance with another aspect of the present invention, there is provided a floating liquid intake for a liquid suction removal system, the liquid intake comprising housing defining an internal cavity, the housing having:

a hollow and buoyant annular body, an upper cover extending upwardly from the annular body, and a lower cover extending downwardly from the annular body, the internal cavity being formed between the upper and lower covers, a substantially annular inlet formed in the annular body for ingress of liquid into the cavity, the annular body having a buoyancy sufficient for the liquid intake to float in a liquid with the annular inlet submerged below the surface of the liquid in which the liquid intake is floating, a submersible pump within the cavity and having an inlet which in use is submerged below the surface of the liquid in which the liquid intake is floating, the submersible pump having a discharge outlet in connection with a pipe that extends into the cavity, the pipe extending outside of the cavity for connection to a liquid suction removal system.

A submersible pump has advantages in that it can pump to a greater head than a suction pump. Moreover, the liquid intake of the invention can be modified to include a submersible pump without difficulty, so that the application of the liquid intake of the invention can dictate whether the liquid intake operates under suction or with a submersible pump.

BRIEF DESCRIPTION OF DRAWINGS

In order that the invention may be more fully understood, some embodiments will now be described with reference to the figures in which.

DETAILED DESCRIPTION

Figure 2:
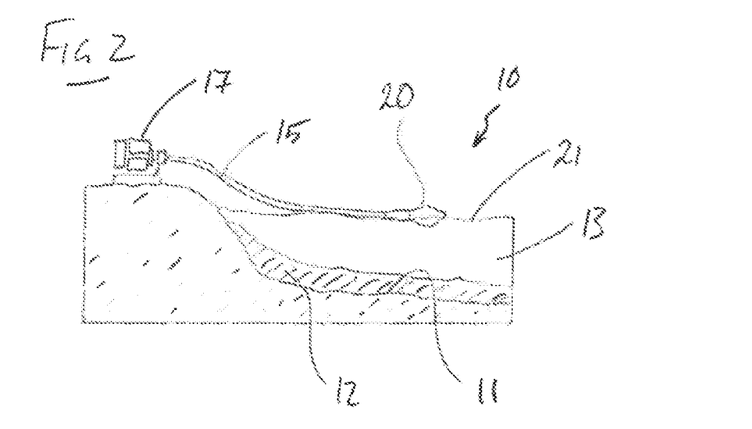
FIG. 2 is a schematic illustration of a pumping arrangement according to the invention.

FIG. 2 is a similar illustration to FIG. 1, but showing schematically, a floating liquid intake 20 according to the present invention in use. FIG. 2 illustrates several of the same features as FIG. 1 and for those features, the same reference numerals are applied. In FIG. 2, it can be seen that the floating liquid intake 20 sits on the surface 21 of the body of water 13 rather than being suspended within the body of water 13 as shown in FIG. 1. It will therefore be appreciated, that the inlet to the liquid intake 20 is much higher than the inlet 16 of FIG. 1. This means that the inlet of the intake 20 of FIG. 2 is much further away from the silt and debris 12 and is located in water which should be cleaner than the water in which the inlet 16 of FIG. 1 is positioned.

Figure 3:
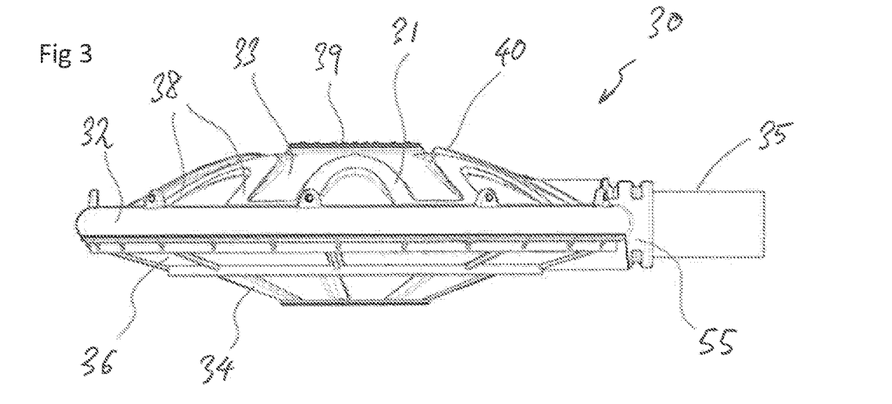
FIG. 3 is a side view of a floating liquid intake according to one embodiment of the invention.

FIG. 3 is a side view of a liquid intake 30 according to the present invention. The liquid intake 30 can be the same as the liquid intake 20 of FIG. 2. The liquid intake 30 has a housing 31 comprising an annular hollow and buoyant body 32, an upper dome shaped cover 33, a lower dome shaped cover 34 and a pipe 35. The annular body 32 includes an annular inlet 36 which includes screens 37 to resist or prevent debris from passing through the inlet 36. The screens 37 are optional, although they are particularly useful for screening large debris, such as fish, leaves, sticks and the like.

Figure 4:
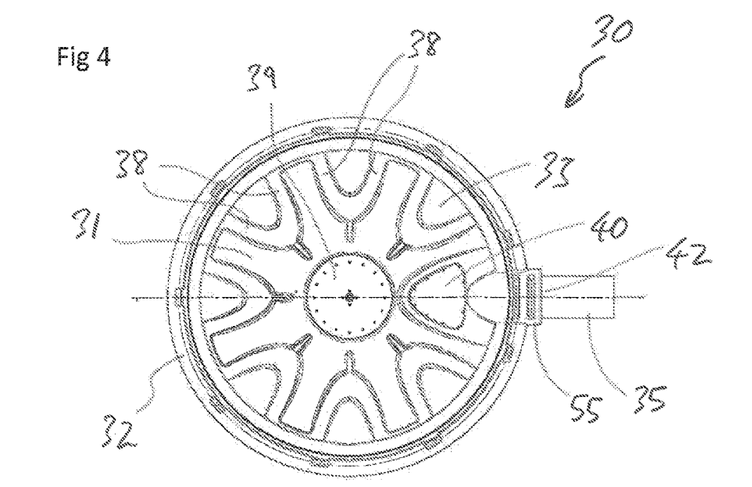
FIG. 4 is a plan top view of a floating liquid intake according to the invention.

FIGS. 4 to 7 show different views of the intake 30 of FIG. 3 and reference will now be made to those figures. FIG. 4 is a plan view of the intake 30 and shows that the upper cover 33 includes a plurality of strengthening ribs 38 to extend radially from a central port closure 39. The closure 39 is provided for access to the interior of the intake 30 and may be removed and replaced as required. The closure 39 is optional and so alternative covers 33 will not include a closure 39. The closure 39 is intended principally for intakes that include a submersible pump as will be described later herein, as the ability to remove the closure 39 provides ready access to the submersible pump. In manufacture, the closure 39 can be formed integrally with the cover 33 and can be removed by cutting for example and re-attached by suitable fasteners. Alternatively it can be separately manufactured and suitable fasteners can be employed to make the connection between the closure 39 and the surrounding upper cover 33.

A second port closure 40 is provided and likewise provides access to the cavity within the intake 30 and likewise can be removed and replaced as required. The closure 40 is intended to provide access to within the cavity of the intake 30 adjacent to the inlet of the pipe 35 through the body 32, so that the pipe 35 and associated components can be readily accessed.

Figure 5:
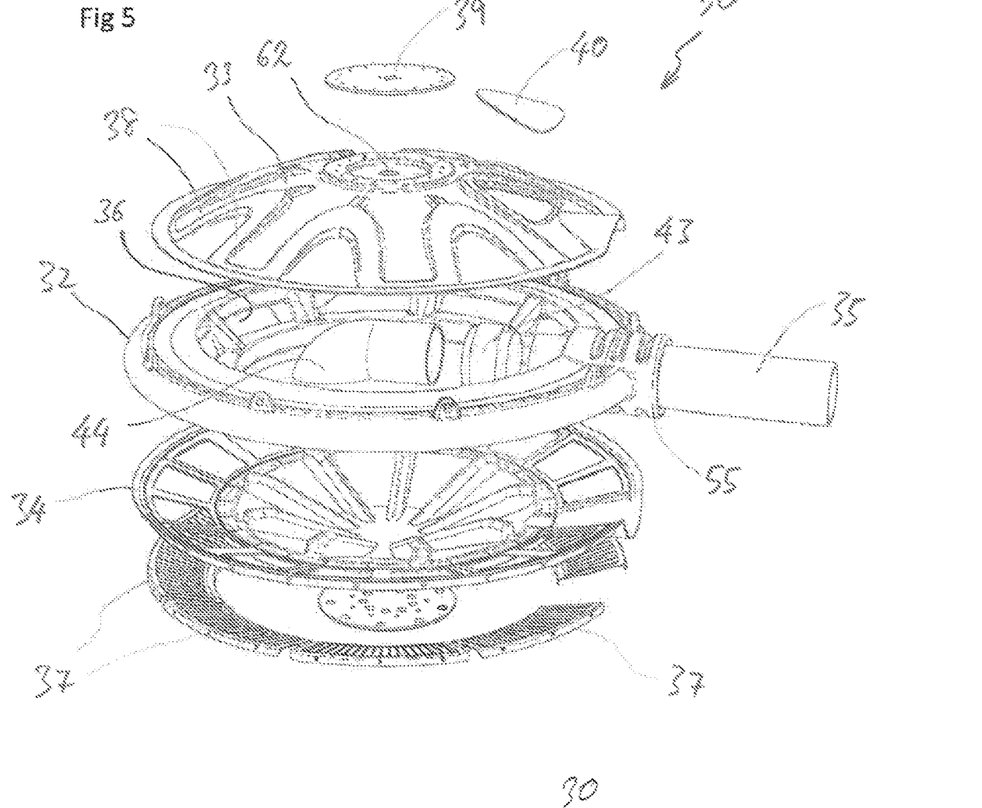
FIG. 5 is an exploded perspective view of the floating liquid intake of FIG. 4.

FIG. 5 shows the intake 30 in exploded view and this view shows that the annular body 32 includes an opening 42 through which the pipe 35 extends. The pipe 35 thus extends into the cavity 58 within the housing 31, through the opening 42 of the body 32 and the pipe 35 extends to a coupling 43 and to a pipe intake 44. Alternatively, the pipe 35, the coupling 43 and the pipe intake 44 can be formed integrally.

Figure 6:
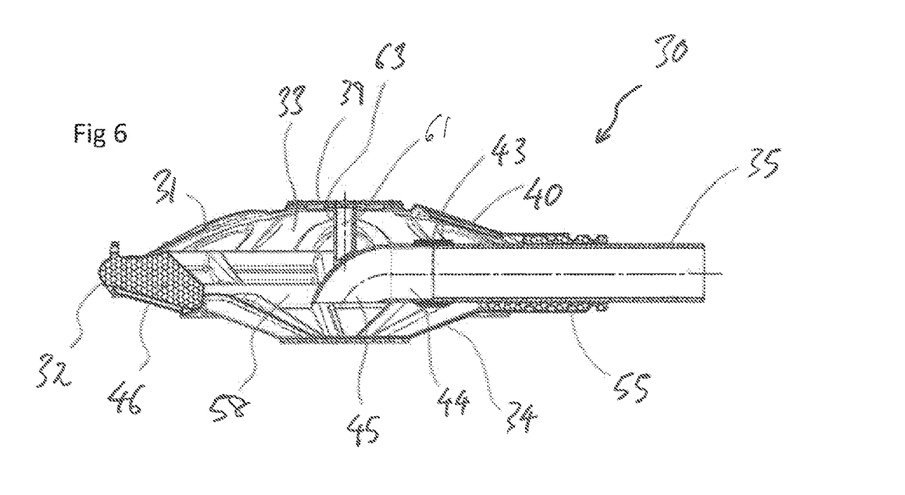
FIG. 6 is a cross-sectional view of the floating liquid intake of FIG. 4.

As shown in FIG. 6, the intake 44 includes a downwardly facing intake opening 45 which in use, is below the surface of the liquid within the cavity 58 when the intake 30 is submerged in a body of liquid. It is to be noted however, that the downward facing orientation of the pipe opening 45 is not critical, and that it could alternatively open upwardly.

Figure 7:
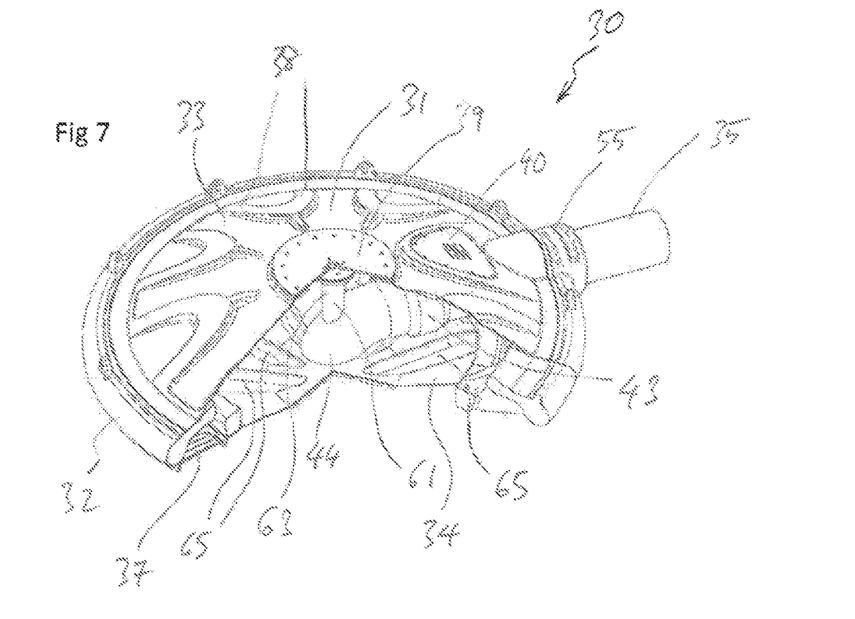
FIG. 7 is a part cut-away perspective view of the floating liquid intake of FIG. 4.
Figure 8:
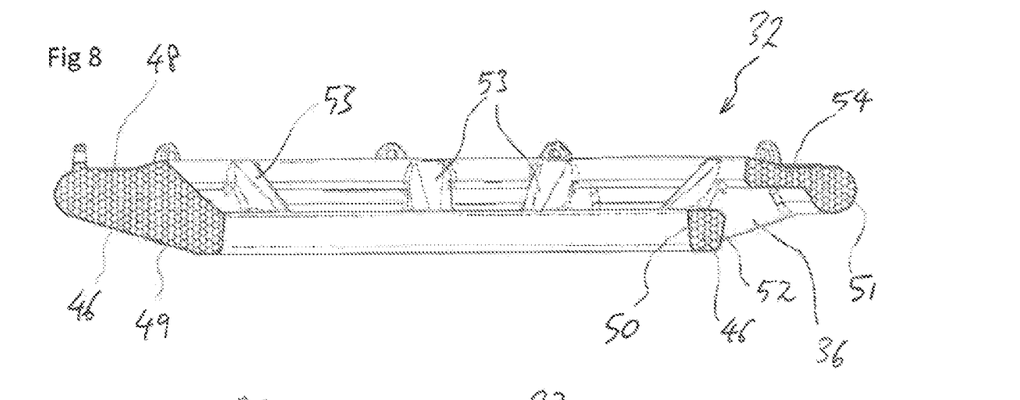
FIG. 8 is a side cross-sectional view through an annular body of the floating liquid intake of FIGS. 4 to 7.

The annular body 32 is shown in cross-section in FIGS. 6, 7 and 8, and in particular from FIGS. 6 and 8, it can be seen that the body 32 is formed as a hollow body which is shown filled with a buoyant material 46. This arrangement of filling the hollow annular body 32 with a buoyant material 46 is optional, but as explained earlier, the use of a buoyant material 46 can improve both the rigidity of the annular body 32 and can prevent the intake 30 from sinking in the event of rupture of the wall of the annular body 32.

Figure 9:
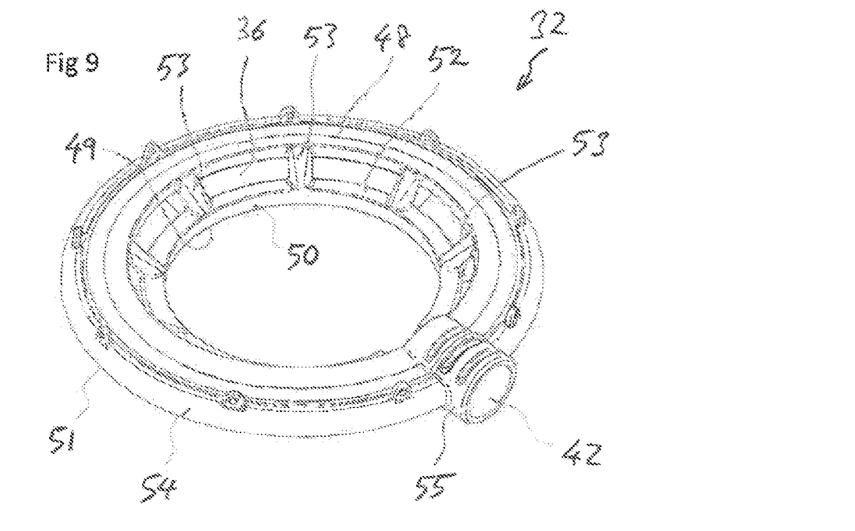
FIG. 9 is a perspective view of the annular body of FIG. 8.
Figure 10:
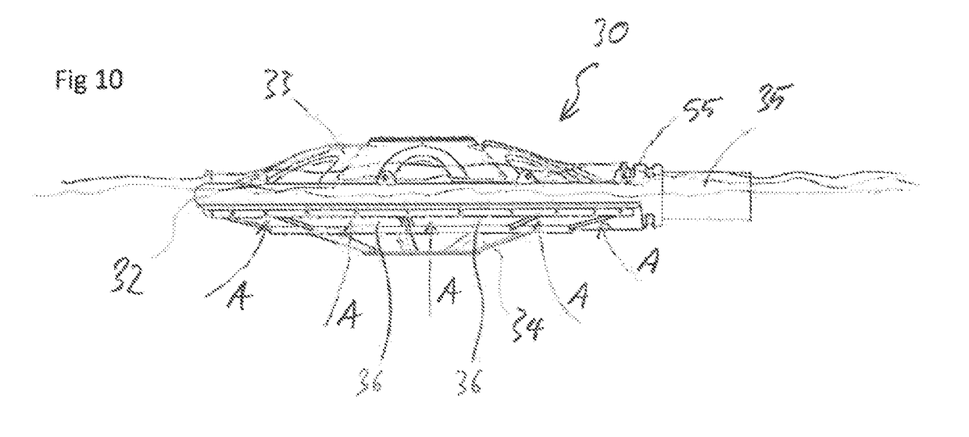
FIG. 10 is as illustration of the floating liquid intake of FIGS. 4 to 7 in use.

FIG. 9 shows the annular body 32 in isolation and that figure, it can be seen that the annular body 32 includes upper and lower surfaces 48 and 49 and inner and outer edges 50 and 51. The inner edge 50 forms an inner surface of a lower ring 52 which is connected by webs 53 to an upper ring 54. The opening 42 is formed in a tube 55 that extends through the lower and upper rings 52 and 54. The tube 55 is intended to be almost entirely submerged when the liquid intake 30 is operational as shown in FIG. 10. The lower and upper rings 52 and 54 are separated by an annular inlet 36 which is interrupted only by the webs 53 and by the inlet tube 55. As shown in FIG. 8, the outer diameter of the lower ring 52 is less that the inner diameter of the upper ring 54. The annular inlet 36 forms the inlet for entry of liquid into the cavity 58 during use of the liquid intake 30 and can be overlaid by the screens 37 illustrated in FIGS. 3, 5 and 7, as required.

It will be evident from FIGS. 5, 6 and 7, that the housing 31 forms the internal cavity 58 between the upper and lower covers 33 and 34, and the annular body 32. Moreover, the pipe opening 45 of the pipe intake 44 is positioned generally centrally of the cavity, or centrally of the annular body 32. That central positioning of the opening 45 means that in a stationary body of water, water is entrained into the cavity 58 from the same distance around the opening 45. FIG. 10 illustrates the liquid intake 30 in an in use condition, and the arrows A indicate the direction in which water is entrained into the cavity 58 and it can be seen that the arrows extend completely about the circumference of the intake 30. Moreover, FIG. 10 shows the upper level of the body of water within which the intake 30 is submerged and it can be seen from this, that the annular inlet 36 is completely submerged within the body of water. Assuming that there are no other air intake areas, so that the connection between the upper cover 33 and the annular body 32 is generally airtight, and that the covers 39 and 40 of the upper cover 33 are in place, then the only entrance into the cavity 58 is through the screens 37 and the annular inlet 36. This tends to generate a vacuum within the cavity of the housing 31 which tends to raise the level of liquid within the cavity 58 relative to the level of the body of water within which the intake 30 is submerged. Depending on the volume being pumped, substantially the entire cavity 58 can be filled with liquid.

As is explained earlier herein, by entraining water into the cavity 58 through the annular inlet 36, the effect is that liquid enters the pipe intake 44 from the side, rather than from directly below (or directly above if the pipe opening 45 faces upwardly rather than downwardly). As explained earlier herein, the intake 30 can prevent the formation of vortices by the direction of travel of liquid into the pipe intake 44, that being from the side rather than above or below, while the annular body 32 itself disrupts the formation of vortices from outside the intake 30. Vortices are therefore prevented or minimised to the extent that they do not cause any damage to the pumping station to which the pipe 35 extends, thus dealing with a major difficulty associated with prior art arrangements of the kind shown in FIG. 1.

In addition, the position of the intake 30 at the surface of the body of water means that the water being entrained is the cleanest water in that body.

In order for the intake 30 to submerge in a body of water, it is necessary for the air within the cavity 58 to be exhausted upon placement of the intake on to the surface of the body of water. Air can initially exhaust through the annular inlet 36, but water will soon cover the inlet 36 completely and so further exhaust through the inlet 36 is not possible. The present invention thus employs an arrangement in which a column 61 is employed and the operation of that column is explained later herein.

FIG. 7 also shows ribs or baffles 65 that have been included in the lower cover 34 and that extend upwardly from the cover 34 into the cavity 58. The baffles 65 are intended to resist movement of liquid within the cavity 58, in particular swirling movement, during operation of the liquid intake 30. That movement can generate air bubbles which can become entrained within the liquid entering the pipe intake 45 and so minimising the liquid movement is advantageous, noting that there must be some movement within the cavity 58 for the liquid to be removed via the liquid intake 30.

The intake 30 has been designed for use with a suction pumping system in which a suction pump or pumps are positioned remote from the intake on land, or on a floating body, such as a pontoon or barge, and are connected to the intake 30 via an intake pipe 35, or another pipe or conduit connected to the intake pipe 35. The distance between the suction pump or pumps and the liquid intake 30 can be in the order of 10 to 30 meters.

Suction pumps have a limitation in that they have a theoretical maximum lift of no more than about 10 m. This assumes a perfect vacuum and very few friction losses and in practice, the suction lift is less than this. While that level of lift is suitable for many applications, if a greater lift is required, than the present invention can employ a submersible pump within the cavity 58 and this arrangement is illustrated in FIG. 11.

Figure 11:
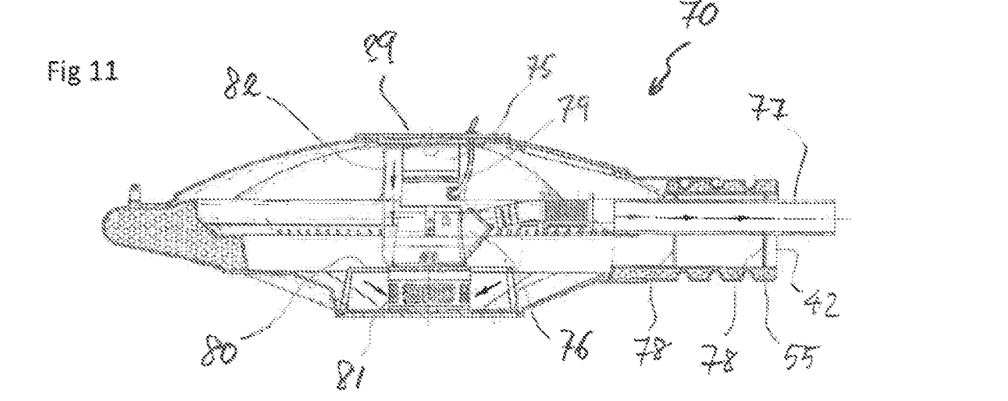
FIG. 11 is a cross-sectional view of an alternative floating liquid intake according to the invention, incorporating a submersible pump.
Figure 12:
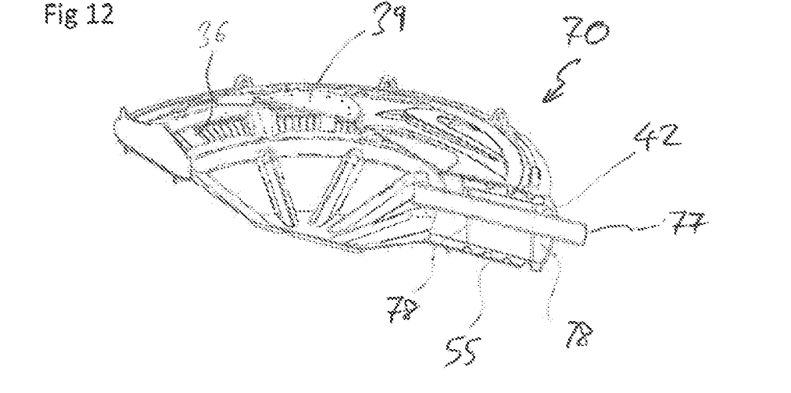
FIG. 12 is a part cut-away perspective view of the floating liquid intake of FIG. 11 with the submersible pump removed.

In FIG. 11, the liquid intake 30 of the earlier figures has been modified to form the liquid intake 70 in which the pipe intake 44 is removed and to include a submersible pump 75 which is positioned centrally of the liquid intake 70 and beneath the closure 39. The submersible pump 75 is of a known form and includes a discharge outlet 76 that connects to a pipe 77. The pipe 77 is of a reduced diameter compared to the pipe 35 of the earlier figures and is supported within the opening 42 of the tube 55 by a pair of brackets 78 (see also FIG. 12 in which the submersible pump 75 is not shown) that fill the opening 42 and include an opening through which the pipe 77 extends.

The submersible pump 75 further includes a power cable 79 and a base plate 80 to secure the pump 75 within the cavity 58. An inlet 81 sits below the base plate 80 and liquid flows through the base plate 80, into the inlet 81 for discharge through the outlet 76. A vacuum chamber pipe 82 operates in the manner of the column 61 as hereinafter described to exhaust air from within the cavity 58 for pump priming purposes.

Returning to FIG. 6, the liquid intake 30 is able to be primed via an opening 60 that extends through a wall of the pipe intake 44 and that communicates with a vertical column 61 that extends into connection with a central opening 62 (see FIG. 5). The column 61 provides structural rigidity to the pipe intake 44 by connecting the intake 44 with the centre of the upper cover 33, but the column 61 also includes an opening in the region of reference numeral 63 and that opening 63 allows air to exhaust from within the cavity 58 as liquid enters the cavity 58, whereby the air passes into the column 61 through the opening at reference numeral 63, then downwardly through the column 61 and through the opening 60 into the intake 44. The air can then exhaust through the pipe 35. This process will continue until the level of liquid within the cavity 58 reaches the opening 60 in the intake pipe 44, so that no further exhaust of air through the column 61 can take place. However, upon generation of suction through the pipe 35, water rushing past the opening 60 will entrain air within the column 61 into the pipe 35, so that a vacuum will be generated within the column 61. This will tend to draw air through the opening at reference numeral 63 and into the column 61 and allow for the liquid level within the cavity 58 to rise. This is effectively how the vacuum is generated within the housing 31 of the intake 30 as discussed earlier herein. The entrainment of air within the within the column 61 into the pipe 35 only occurs briefly and is not continuing. Accordingly, there is no detriment to the operation of the liquid removal system by this small volume of air that is pumped through the system.

Floating liquid intakes according to the present invention can be operated from land or water borne vehicles or structures.

Figure 13:
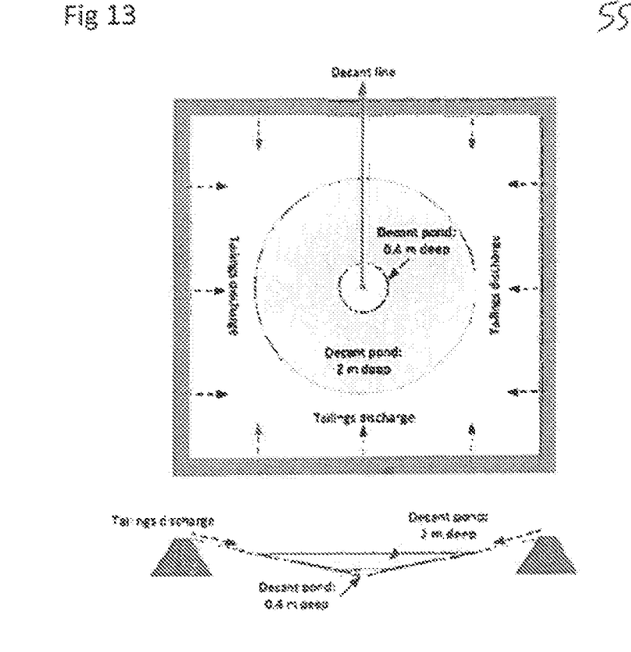
FIG. 13 illustrates a comparison with an existing tailings dam and a tailings dam in which a liquid intake according to the present invention is employed.

Floating liquid intakes according to the present invention can also permit significant reduction in the volume and surface area of ponds or dams, advantageously reducing losses through evaporation and reducing the land required for ponds or dams to be installed. FIG. 13 illustrates a comparison with an existing tailings dam and a tailings dam in which a liquid intake according to the present invention is employed. For this, the required radius and resultant area of decant pond and exposed tailings beach area were determined for two scenarios:

a standard decant intake requiring a minimum 2 m pond depth, and     a liquid intake according to the present invention requiring only 0.4 m minimum pond depth.

The comparison between the two scenarios is:

1. Standard intake, 2 m pond depth:
    a. Required minimum pond radius around the decant intake: 133 m
    b. Resultant decant pond surface area: ~70,500 $m^2$
    c. Exposed beach area: ~179,500 $m^2$ or 72% of total temporary storage facility (TSF) area.
2. Invention intake, 0.4 m pond depth:
    a. Required minimum pond radius around the decant station intake: 27 m
    b. Decant pond surface area: ~2,300 $m^2$
    c. Exposed beach area: ~247,700 $m^2$ or 99% of total TSF (tailings dam) area.

For this conceptual scenario, the use of the Invention intake allows the potential for 1. 96% reduction in the decant pond area, which also reduces evaporative losses from the pond itself by 96%.
2. At an example daily mean evaporation rate of 10 mm per day, this equates to a reduction in evaporative losses of 247 megalitres per year from the decant pond 3. 38% increase in exposed tailings beach area, enhancing tailings drying with potential improvement in deposited density resulting in less frequent embankment raises and lower associated costs.

The benefits of the Invention intake:

|  | Decant Barge, Decant Tower etc | Invention intake |
| --- | --- | --- |
| Minimum pond radius | 133 m | 27 m |
| Decant pond surface area | ~70.500 m$^2$ | ~2.300 m$^2$ |
| Reduction in pond surface area | 0% | 96% |
| Exposed beach area | ~179.500 m$^2$ | ~247.700 m$^2$ |
| Exposed beach percentage | 72% of total TSF area | 99% of total TSF area |
| Increase in exposed beach area | 0% | 38% |
| Yearly evaporation saving | 0 megalitres pa | 247 megalitres pa |

This illustrates the potential magnitude of the benefit delivered by the Invention intake to an operation from environmental, reputational, risk management and economic perspectives. Similar benefits would also be evident in deployment of the Invention intake into other TSF configurations.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereto.

The claims defining the invention are as follows:

1. A floating liquid intake for a liquid suction removal system, the liquid intake comprising a housing defining an internal cavity, the housing having:
   a hollow and buoyant annular body having upper and lower annular portions that are spaced apart but connected together and that form a substantially annular inlet between them for ingress of liquid into the cavity, the upper and lower annular portions each having an outer diameter and the outer diameter of the upper annular portion being greater than the outer diameter of the lower annular portion, and the annular inlet being formed radially inwardly of the outer diameter of the upper annular portion,
   an upper cover extending upwardly from the upper annular portion of the annular body, and
   a lower cover extending downwardly from the lower annular portion of the annular body,
   the internal cavity being formed between the upper and lower covers,
   the annular body having a buoyancy sufficient for the liquid intake to float in a liquid with the annular inlet submerged below the surface of the liquid in which the liquid intake is floating so that liquid entering the annular inlet flows below the upper annular portion before entering the annular inlet,
   a pipe extending into the cavity, the pipe including an inlet that in use is open below the surface of the liquid within the cavity, the pipe extending outside of the cavity for connection to a liquid suction removal system.

2. A floating liquid intake according to claim 1, the annular body being a rotational moulded body.

3. A floating liquid intake according to claim 1, the annular body being filled with a buoyant material.

4. A floating liquid intake according to claim 3, the buoyant material being polyurethane (PU) foam.

5. A floating liquid intake according to claim 1, the annular body having upper and lower surfaces and radially spaced inner and outer edges.

6. A floating liquid intake according to claim 5, the upper cover being attached to the upper surface and the lower being attached to the lower surface.

7. A floating liquid intake according to claim 5, the annular body having an opening through which the pipe extends and the opening extending through the annular body from the outer edge to the inner edge.

8. A floating liquid intake according to claim 1, the annular body having an opening through which the pipe extends.

9. A floating liquid intake according to claim 1, the liquid intake being generally airtight when submerged to a level at which the annular inlet below the surface of the liquid in which the liquid intake is floating.

10. A floating liquid intake according to claim 1, including debris screens overlying the annular inlet.

11. A floating liquid intake according to claim 1, the upper cover including a central closure for access to within the housing when removed.

12. A floating liquid intake according to claim 1, further including a submersible pump within the cavity.

13. A floating liquid intake according to claim 1, the lower cover including radial baffles projecting upwardly into the cavity.

14. A floating liquid intake according to claim 1, the intake being operable in water depths as shallow as 400 mm.

15. A floating liquid intake for a liquid suction removal system, the liquid intake comprising housing defining an internal cavity, the housing having:
   a hollow and buoyant annular body having upper and lower annular portions that are spaced apart but connected together and that form a substantially annular inlet between them for ingress of liquid into the cavity, the upper and lower annular portions each having an outer diameter and the outer diameter of the upper annular portion being greater than the outer diameter of the lower annular portion, and the annular inlet being formed radially inwardly of the outer diameter of the upper annular portion,
   an upper cover extending upwardly from the upper annular portion of the annular body, and
   a lower cover extending downwardly from the lower annular portion of the annular body,
   the internal cavity being formed between the upper and lower covers,
   the annular body having a buoyancy sufficient for the liquid intake to float in a liquid with the annular inlet submerged below the surface of the liquid in which the liquid intake is floating so that liquid entering the annular inlet flows below the upper annular portion before entering the annular inlet,
   a submersible pump within the cavity and having an inlet which in use is submerged below the surface of the liquid in which the liquid intake is floating, the submersible pump having a discharge outlet in connection with a pipe that extends into the cavity, the pipe extending outside of the cavity for connection to a liquid suction removal system.

16. A method of operating a liquid suction removal system using a floating liquid intake, the liquid intake comprising a housing defining an internal cavity, the housing having: a hollow and buoyant annular body, an upper cover extending upwardly from the annular body, and a lower cover extending downwardly from the annular body, the internal cavity being formed between the upper and lower covers, a substantially annular inlet formed in the annular body for ingress of liquid into the cavity, the annular body having a buoyancy sufficient for the liquid intake to float in a liquid with the annular inlet submerged below the surface of the liquid in which the liquid intake is floating, a pipe extending into the cavity and having an inlet and the pipe extending outside of the cavity for connection to the liquid suction removal system, the method comprising:

placing the liquid intake in a body of liquid whereby the inlet of the pipe is open below the surface of the liquid within the cavity, operating the liquid suction removal system to draw liquid into the internal cavity through the annular inlet to generate a vacuum within the internal cavity tending to raise the level of liquid within the cavity relative to the level of the surface of the liquid in which the liquid intake is floating so as to substantially fill the internal cavity with liquid and continuing to draw liquid into the internal cavity through the annular inlet for removal through the pipe by the liquid suction removal system.

17. A method of operating a liquid suction removal system according to claim 16, the method comprising placing the liquid intake in a body of liquid that has a depth of 400 mm or more.

* * * * *